April 7, 1942. T. H. DUNN 2,278,841
DRILL MUD TREATING
Filed Nov. 22, 1940
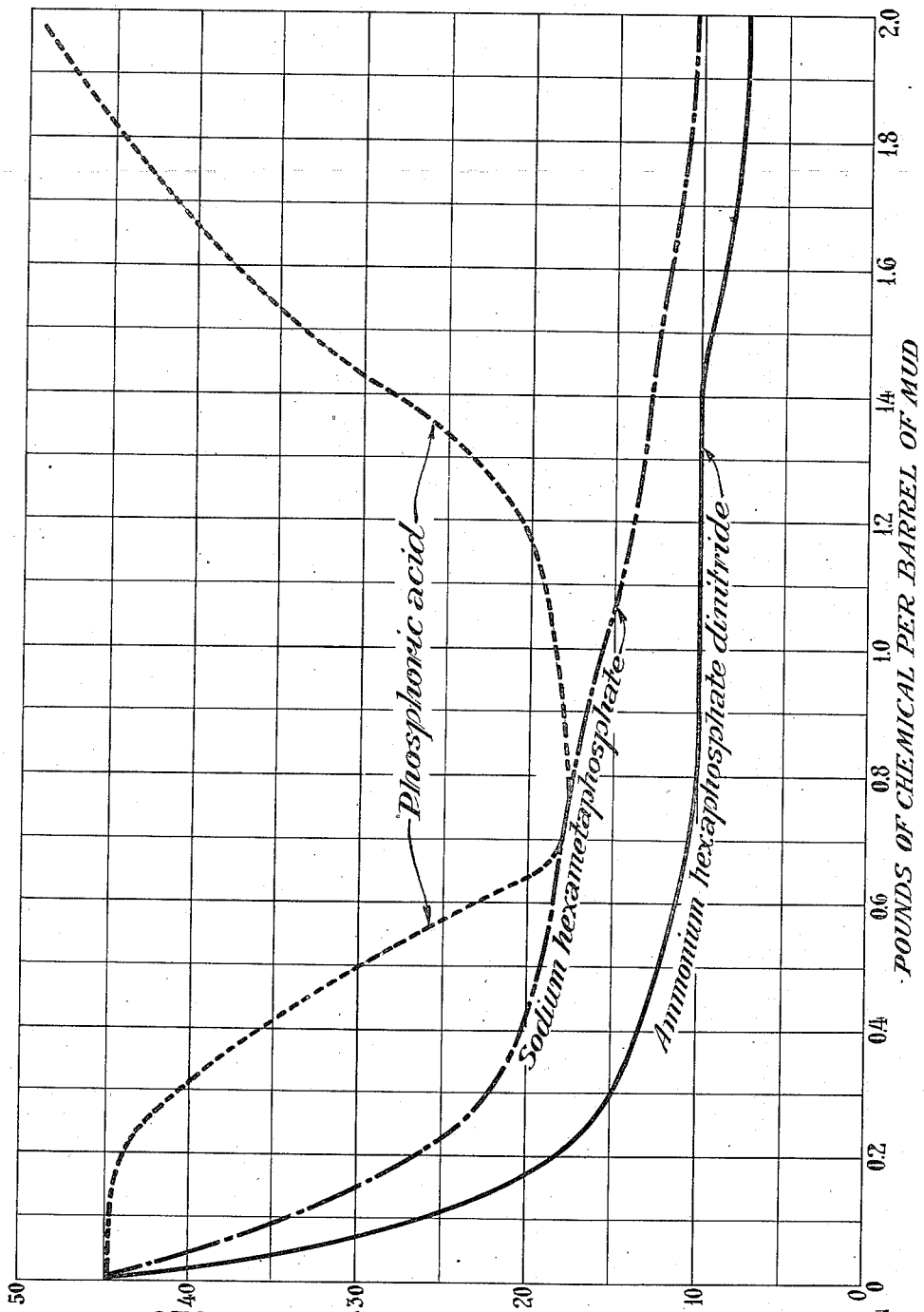
Inventor:
Thomas H. Dunn
By Geo. L. Parkhurst
Attorney Patented Apr. 7, 1942

2,278,841

UNITED STATES PATENT OFFICE 2,278,841

DRILL MUD TREATING

Thomas H. Dunn, Tulsa, Okla., assignor to Stanolind Oil & Gas Company, Tulsa, Okla., a corporation of Delaware Application November 22, 1940, Serial No. 366,614

9 Claims. (Cl. 252—8.5)

This invention relates to drill muds used in drilling wells such as oil and gas wells and also relates to the treating of such drill muds, it relates more particularly to the treating of drill muds to reduce their gel strengths and/or viscosities.

It is common practice to treat drill muds with any of several chemicals, such as sodium tannate, gallic acid, or sodium hexametaphosphate, for the purpose of reducing the mud viscosities and gel strengths. Mud of excessive viscosity and gel strength is undesirable in that it gas-cuts easily and does not allow proper removal of cuttings at the surface. Since drill muds are essentially colloidal in nature, their properties are greatly affected by even small quantities of electrolytes. Thus a drill mud can pick up sufficient quantities of such salts as calcium sulphate or calcium carbonate from underground formations to result in substantial increases in its viscosity and gel strength. In a similar manner, drilling of cement plugs results in the mud acquiring high viscosity-gel characteristics as a result of calcium hydroxide present in the cement. Due to the many factors that increase the viscosity-gel characteristics of drill muds, the treating of muds to reduce viscosity and gel strength is highly important.

An object of my invention is to provide an improved reagent for treating drill muds. A more particular object of my invention is to provide an improved method, utilizing a new and improved reagent, for reducing the gel strength and/or viscosity of drill muds. Other and more particular objects, advantages and uses of my invention will become apparent as the description thereof proceeds.

I have found that a small amount of a hexaphosphate dinitride added to a cement-cut drill mud or to any other drill mud of excessive viscosity and/or gel strength serves to correct these undesirable characteristics more advantageously than other treating reagents.

The preferred reagent is ammonium hexaphosphate dinitride which has the formula $(NH_4)_6P_6N_2O_{15}$. The actual molecular weight has not been determined, but the molecule is perhaps several times the size indicated by the above formula since various degrees of polymerization are obtained according to the method by which the material is produced. This material is available as an article of commerce.

The simplest structural formula is probably about as follows:

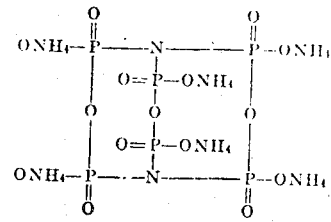

Ammonium hexaphosphate dinitride is an exceedingly water-soluble, very hygroscopic, white powder which, in one-half per cent solution, yields a pH of 4.8.

In place of ammonium hexaphosphate dinitride, which term includes the various polymers, I can use other water-soluble hexaphosphate dinitrides, in any degree of polymerization, thus the various alkali metal hexaphosphate dinitrides can be employed in accordance with my invention. Sodium hexaphosphate dinitride and potassium hexaphosphate dinitride are examples. The alkali metal can replace either all the $NH_4$ of ammonium hexaphosphate dinitride or only a portion thereof.

Thus ammonium hexaphosphate dinitride can be treated with alkalies to a pH of approximately 8 without liberation of ammonia, but if caustic soda or soda ash is added beyond this point, the ammonium nitrogen is completely displaced and the pH will rise. The nuclear nitrogen, however, is not displaced by the addition of alkalies.

These various drill mud treating agents can be added to drill muds in various manners known to the art for instance by dissolving the reagent in water or part of the drill mud and then adding this solution to the bulk of the drill mud.

The amount of reagent used can range from a very small amount, for instance about 0.1 pound per barrel of drill mud, up to any amount desired for instance 2.0 pounds per barrel. In fact one advantage of my treating reagents is that it is impossible to over-treat, whereas with some prior art reagents the addition of too much of the reagent has markedly adverse effects.

While it is impossible to over-treat with my reagents a point is reached at which further additions are uneconomical. This point depends on the nature of the mud to be treated, the results desired, and the reagent chosen. In general it is preferred to use from about 0.2 pound to about 1.0 pound per barrel of mud.

The accompanying drawing which forms a part of this specification and should be read in conjunction therewith illustrates the effect on drill mud viscosity of adding various amounts of three reagents to a cement-contaminated drill mud having a Stormer viscosity of 45 centipoises. It will be seen that ammonium hexaphosphate dinitride is highly effective in small concentrations and in fact is notably superior to sodium hexametaphosphate which is generally considered to be the best reagent now employed. Phosphoric acid is not only incapable of producing a viscosity as low as is sometimes desired but is extremely difficult to employ in practice since the danger of over-treating is very great.

In addition to its greater effectiveness, ammonium hexaphosphate dinitride is also markedly superior to sodium hexametaphosphate and other prior art reagents by virtue of its unusually high degree of water solubility and unusual stability when heated in solution, both of which properties facilitate the mud treating operation.

While I have described my invention in connection with certain preferred embodiments thereof, it will be understood that these are by way of illustration rather than by way of limitation and that I do not mean to be restricted thereby but only to the invention defined in the appended claims.

I claim:

1. A drill mud including an amount of water-soluble hexaphosphate dinitride sufficient to reduce markedly the viscosity of said drill mud.

2. A drill mud including from about 0.1 to about 2.0 pounds per barrel of a hexaphosphate dinitride selected from the group consisting of the ammonium and alkali metal hexaphosphate dinitrides.

3. A cement-contaminated drill mud including from about 0.1 to about 1.0 pound per barrel of a hexaphosphate dinitride selected from the group consisting of the ammonium and alkali metal hexaphosphate dinitrides.

4. A drill mud including from about 0.1 to about 2.0 pounds per barrel of ammonium hexaphosphate dinitride.

5. A drill mud including from about 0.1 to about 2.0 pounds per barrel of sodium hexaphosphate dinitride.

6. A drill mud including from about 0.1 to about 2.0 pounds per barrel of potassium hexaphosphate dinitride.

7. A method of treating a drill mud to improve its viscosity-gel characteristics comprising incorporating therein a small but effective quantity of a water-soluble hexaphosphate dinitride.

8. A method of treating a drill mud comprising incorporating therein from about 0.1 to about 2.0 pounds per barrel of a hexaphosphate dinitride selected from the group consisting of the ammonium and alkali metal hexaphosphate dinitrides.

9. A method of treating a drill mud to improve its viscosity-gel characteristics comprising incorporating therein from about 0.1 to about 1.0 pound per barrel of ammonium hexaphosphate dinitride.

THOMAS H. DUNN.